(12) United States Patent
Guo (10) Patent No.: US 10,598,113 B2
(45) Date of Patent: Mar. 24, 2020

(54) METHOD FOR DETERMINING AND APPLYING AN ENGINE MISFIRE THRESHOLD

(71) Applicant: Ford Global Technologies, LLC, Dearborn, MI (US)

(72) Inventor: Yichao Guo, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/644,402

(22) Filed: Jul. 7, 2017

(65) Prior Publication Data

US 2018/0058358 A1 Mar. 1, 2018

Related U.S. Application Data

(60) Provisional application No. 62/382,003, filed on Aug. 31, 2016.

(51) Int. Cl.
| | |
|---|---|
| F02D 41/14 | (2006.01) |
| F02P 5/153 | (2006.01) |
| F02D 41/30 | (2006.01) |
| F02P 5/15 | (2006.01) |

(52) U.S. Cl.
CPC .......... F02D 41/1498 (2013.01); *F02D 41/30* (2013.01); *F02D 2200/1002* (2013.01); *F02D 2200/1012* (2013.01); *F02D 2200/1015* (2013.01); *F02P 5/15* (2013.01); *F02P 5/153* (2013.01)

(58) Field of Classification Search
CPC ......... F02D 41/1498; F02D 2200/1015; F02D 41/22; F02D 2200/1002; F02D 2200/1012; F02D 41/30; G01M 15/11; G01M 15/046; F02P 5/15; F02P 5/153
See application file for complete search history.

(56) References Cited

U.S. PATENT DOCUMENTS

| | | | |
|---|---|---|---|
| 5,440,922 A * | 8/1995 | Ichikawa | G01M 15/11 701/111 |
| 5,742,276 A * | 4/1998 | Taraki | F02P 17/08 324/379 |
| 5,862,507 A | 1/1999 | Wu et al. | |
| 6,208,930 B1 | 3/2001 | Uematsu | |
| 6,282,564 B1 * | 8/2001 | Smith | H04L 29/06 709/206 |
| 6,314,802 B1 * | 11/2001 | Wu | G01M 15/11 123/436 |

(Continued)

OTHER PUBLICATIONS

Shin KG Ramanathan P Jan. 1994 Real-time computing Proceedings of the IEEE.*

*Primary Examiner* — Carl C Staubach
(74) *Attorney, Agent, or Firm* — Geoffrey Brumbaugh; McCoy Russell LLP (57) ABSTRACT

Systems and methods for operating an engine operated by a controller that has a capacity to determine whether or not misfire occurs in the engine are presented. In one example, an operating region of the engine is broken into a plurality of zones and a misfire threshold level is dynamically provided for each of the plurality of zones based on slowly updated zone-level statistical parameters and quickly updated buffer-level parameters. The real-time dynamic misfire thresholds provide a basis for determining misfire within the engine.

11 Claims, 7 Drawing Sheets

(56) References Cited

U.S. PATENT DOCUMENTS

| | | | | |
|---|---|---|---|---|
| 6,847,882 | B2 | 1/2005 | Miller et al. | |
| 6,978,666 | B1* | 12/2005 | Wu | G01M 15/11 |
| | | | | 73/114.02 |
| 7,032,439 | B2 | 4/2006 | Lee et al. | |
| 10,005,469 | B2* | 6/2018 | Guo | B60W 10/10 |
| 2004/0237635 | A1* | 12/2004 | Ohsaki | F02D 41/1498 |
| | | | | 73/114.07 |
| 2007/0137289 | A1* | 6/2007 | Mathews | G01M 15/11 |
| | | | | 73/114.04 |
| 2010/0318279 | A1* | 12/2010 | Meyer | F02D 35/021 |
| | | | | 701/103 |
| 2011/0288719 | A1* | 11/2011 | Girotto | F02D 41/1401 |
| | | | | 701/31.4 |
| 2013/0191074 | A1* | 7/2013 | Caterini | G01M 15/11 |
| | | | | 702/182 |
| 2016/0097694 | A1* | 4/2016 | Lysenko | G01M 3/025 |
| | | | | 73/40.5 R |

* cited by examiner

METHOD FOR DETERMINING AND APPLYING AN ENGINE MISFIRE THRESHOLD

CROSS REFERENCE TO RELATED APPLICATION

The present application claims priority to U.S. Provisional Patent Application No. 62/382,003 entitled "Method for Determining and Applying an Engine Misfire Threshold," filed on Aug. 31, 2016. The entire contents of the above-referenced application are hereby incorporated by reference in their entirety for all purposes.

FIELD

The present description relates to a system and method for real-time determining detection thresholds for engine misfire detection. The method and system provide the capability of establishing different engine misfire thresholds for each zone of an engine operating range.

BACKGROUND AND SUMMARY

Engine misfire may be determined via monitoring an engine crankshaft position sensor. Changes in engine speed and acceleration during an engine rotation may be indicative of the presence or absence of engine misfire. Engine misfire may be characterized as an air-fuel mixture in a cylinder that fails to ignite during a cycle of the cylinder. Engine misfire reduces engine torque, increases engine emissions, and may degrade engine components, such as the catalyst converter. Therefore, it may be desirable to determine if misfire is present and take mitigating actions to reduce the possibility of misfire during future combustion events.

An engine controller may process an engine crankshaft position sensor signal to provide an associated crankshaft speed or acceleration. The crankshaft speed or acceleration may be monitored during a power stroke of a cylinder being monitored for misfire to judge whether or not misfire has occurred in the cylinder being monitored. For better separation of misfiring and normal firing events, the crankshaft speed and acceleration are typically filtered and re-scaled to misfire index values (these index values could be normalized or not normalized) in order to achieve better separations between normal firing and misfiring events. A misfire threshold is the criteria for separating misfire index values into normal firing or misfiring cylinder events. Most manufacturers adopt after-processing methods to develop misfire thresholds. Such methods rely on the post processing of the test data collected from development vehicles to determine the misfire thresholds. Such misfire thresholds cannot fit the need to address vehicle-to-vehicle variance, vehicle life-cycle changes, and new engine control strategies that will significantly change the noise level of misfire index values in the same speed-load zone.

The inventor herein has recognized the above-mentioned limitations and has developed an engine control and signal-processing method, comprising: dividing an engine operating region into a plurality of zones for misfire threshold determination, each zone within the plurality of zones defined by an engine speed range and an engine load or engine torque range; the misfire threshold for each zone is determined by two sets of statistical parameters (the statistical parameters include but are not limited to mean value, standard deviation, maximum, and minimum values for normal firing and misfiring events respectively): zone-level parameters and buffer-level parameters; zone-level parameters stored in memory representing each of the plurality of zones are slowly updated to catch the vehicle life-cycle changes on misfire index values; buffer-level parameters are real-time calculated from the circular buffer of the immediate past misfire index values to quickly adapt to the engine operation conditions on real-time misfire index values; and dynamically output the misfire threshold by combining zone-level and buffer-level parameters and mixing the associated statistical parameters; and adjusting an actuator via a controller responsive to an indication of misfire based on the misfire threshold level.

By including individual misfire threshold levels for each engine operating zone, it may be possible to provide the technical result of improving engine misfire detection. Individual misfire threshold levels in each engine operating zone may be dynamically tailored to engine operating conditions so that indications of actual engine misfire may be clearly distinguished from non-misfire conditions. For example, standard deviation, mean value, maximum, and minimum of misfire index values for normal combustion events may be real-time assessed to verify if a current misfire threshold level is too high or too low to cause false detections. Likewise, standard deviation, mean value, maximum, and minimum of for misfire index values for misfire events may be real-time assessed to verify if the current misfire threshold level is too high or too low to trigger false detections. The misfire threshold level may be determined based on statistics for the normal combustion event misfire index values and the misfire event misfire index values. Consequently, misfire thresholds for an engine operating zone may be based on misfire index values that occur within an engine operating zone rather than misfire index values that occur outside of the engine operating zone. As a result, misfire threshold values in an engine operating zone may be more closely tailored to conditions within the engine operating zone, thereby improving threshold values and misfire detection.

The present description may provide several advantages. Specifically, the approach may provide improved misfire detection so that fewer false positives are indicated. In addition, the approach may adjust engine operation to reduce negative impacts caused by misfires based on improved misfire detection. As such, engine emissions and fuel economy may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
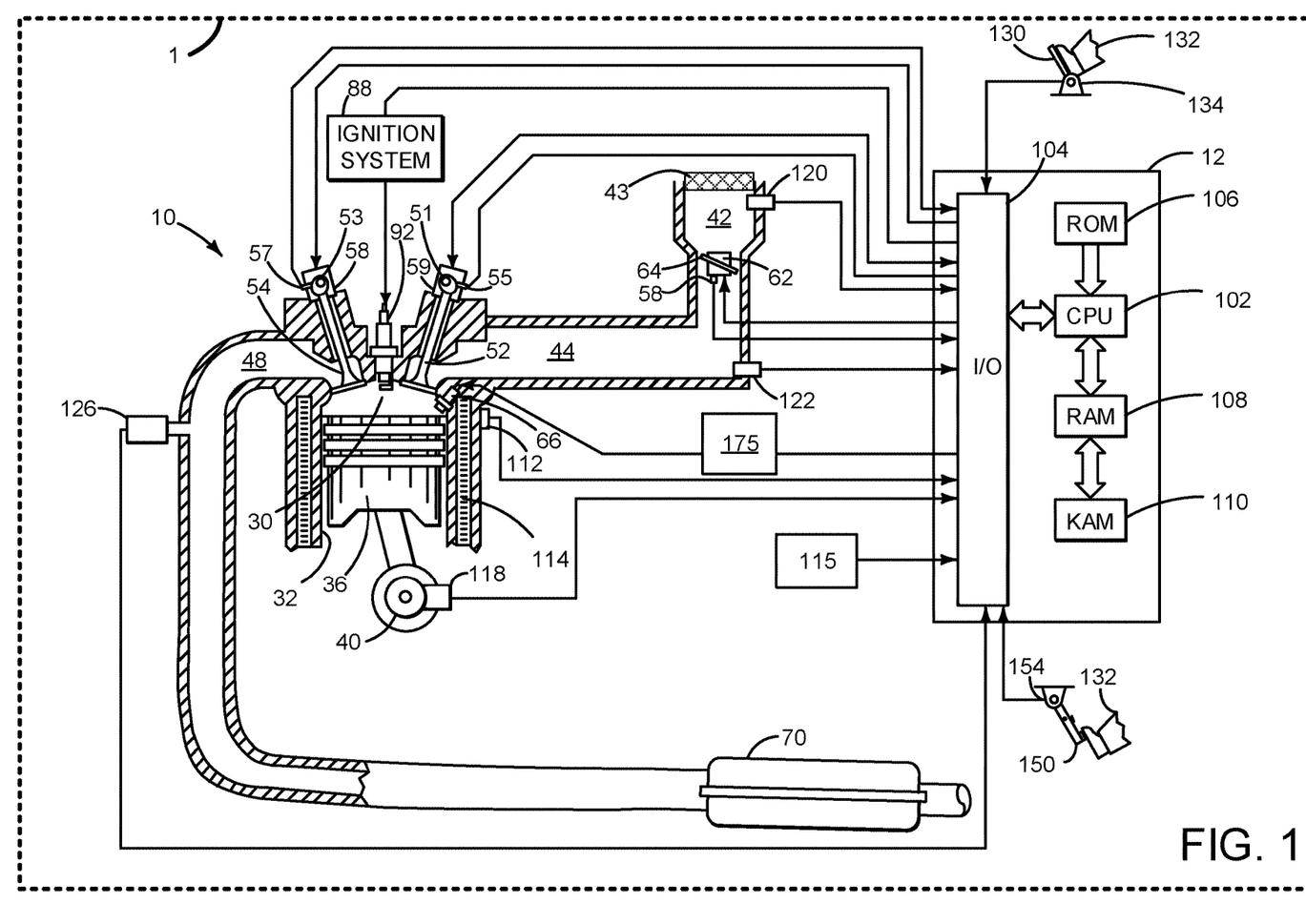
FIG. 1 is a schematic diagram of an engine.
Figure 2:
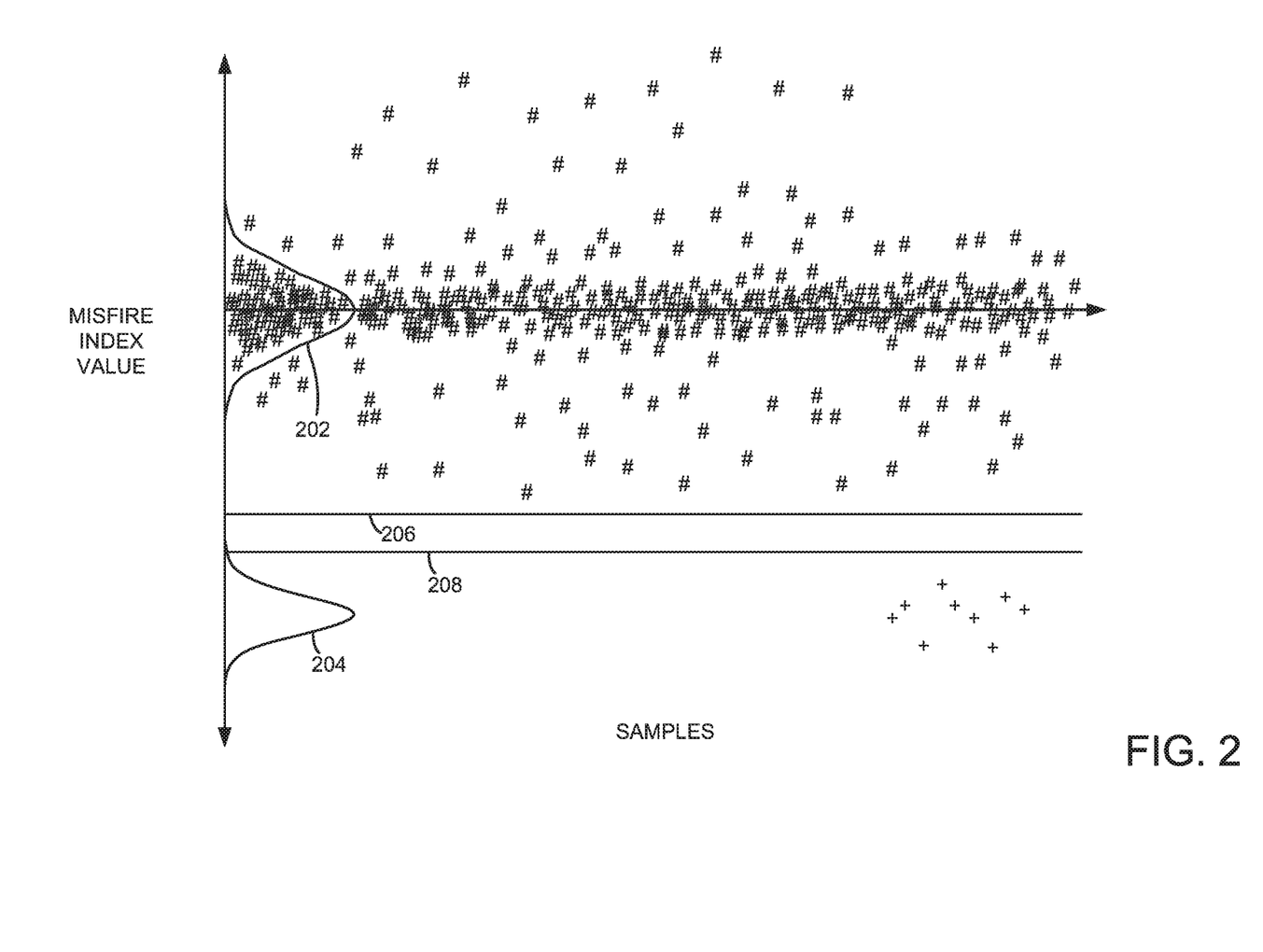
FIG. 2 is a plot illustrating a prophetic distribution of engine misfire index values and distributions for engine misfire events and non-misfire events.
Figure 3:
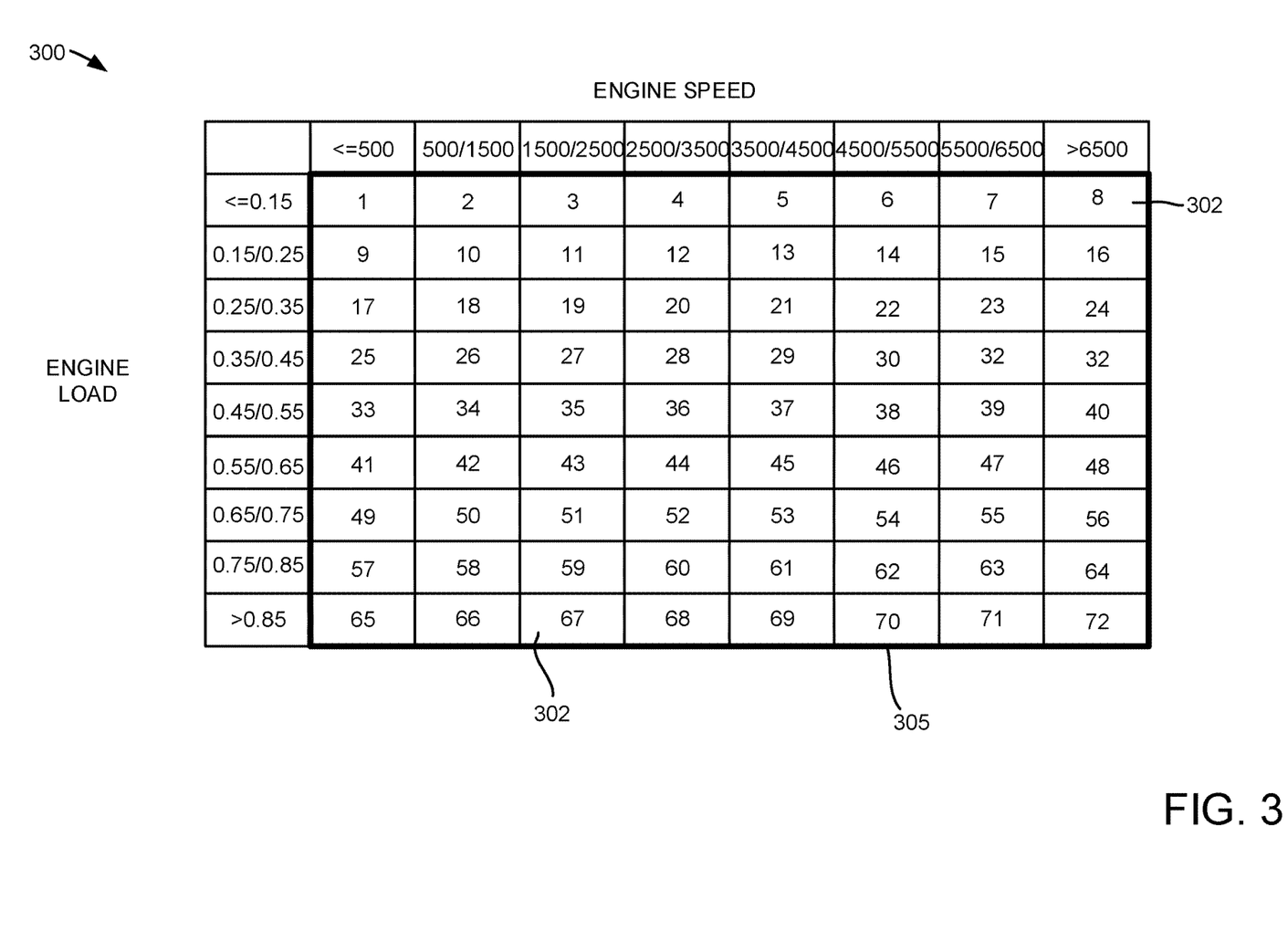
FIG. 3 shows an example table that holds engine misfire index thresholds for judging the presence or absence of engine misfire based on engine misfire index values.

The present description is related to improving detection and mitigation of engine misfire. Misfire may be monitored for an internal combustion engine as shown in FIG. 1. Engine misfire index values may have a distribution as shown in FIG. 2. Engine operating regions or zones may be defined via a table as shown in FIG. 3. Values in the table shown in FIG. 3, which represent threshold limits for accessing misfire, may be determined via the method of FIGS. 4-7. Further, the method of FIGS. 4-7 may adjust one or more engine actuators to reduce the possibility of engine misfire if dynamically determined threshold limits are exceeded.

Referring to FIG. 1, internal combustion engine 10, comprising a plurality of cylinders, one cylinder of which is shown in FIG. 1, is controlled by electronic engine controller 12. Engine 10 may be incorporated in to a vehicle that travels down a road. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40. Intake valves may be deactivated and held in a closed state via intake valve deactivating mechanism 59. Exhaust valves may be deactivated and held in a closed state via exhaust valve deactivating mechanism 58.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175, which includes a tank and pump. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may receive input from human/machine interface 115 (e.g., pushbutton or touch screen display).

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a plot illustrating a distribution of engine misfire index values and distributions for misfire events and non-misfire events is shown. The vertical axis represents values of a normalized misfire index. The horizontal axis represents a number of samples taken of the engine misfire index. The "#" symbol represents values of non-misfire events and the "+" symbol represents values of misfire events. The area above the horizontal axis represents positive values and the area below the horizontal axis represents negative values. Horizontal line 206 represents an engine misfire index value above which engine misfire index values are interpreted as non-misfires. Horizontal line 208 represents an engine misfire index value below which engine misfire index values are interpreted as misfires. Curve 202 represents a six sigma Gaussian distribution region for non-misfire engine misfire index values. Curve 204 represents a six sigma Gaussian distribution region for misfire engine misfire index values.

In this example, there is a clear separation between engine misfire index values that represent non-misfires and engine misfire index values that represent misfires. Specifically, the area between horizontal line 206 and 208 is a region where a threshold engine misfire index may be set as a basis for determining whether an engine misfire index value for a combustion event is a misfire or a non-misfire. The region between line 206 and 208 may not be consistent for all engine speeds and loads. Further, the region between line 206 and 208 may vary as the engine ages and/or operating conditions of the engine vary. Thus, as described herein, it may be desirable to dynamically determine a threshold for judging the presence or absence of engine misfire at a plurality of engine speed and loads (e.g., engine air flow divided by a maximum theoretical engine air flow).

Referring now to FIG. 3, an example table that holds misfire index thresholds for judging the presence or absence of engine misfire is shown. In this non-limiting example, table 300 includes seventy two cells 302. Each of the seventy two cells represents a unique engine operating region or zone. The zones are based on engine speed and load. Further, the table is indexed via engine speed and load to extract or populate values in the table. The table's boundary are indicated by the heavy solid line 305. Boxes along the left side of table 300 and stacked vertically hold engine load values that correspond to the table entries to the right of the boxes. Boxes along the top side of table 300 and connected end to end hold engine speed values that correspond to table entries below the boxes. For example, table entry number one holds an engine misfire index threshold for engine loads below 0.15 and engine speeds below 500 RPM. Similarly, table entry number forty two holds an engine misfire index threshold for engine loads between 0.55-0.65 and engine speeds between 500-1500 RPM. Thus, the engine operating region is divided into a plurality of zones numbered one to seventy two, and each of the zones is defined by an engine speed range and an engine load range. Each of the engine misfire index thresholds may be uniquely tailored to the engine operating zone in which the misfire index threshold occupies.

Figure 4:
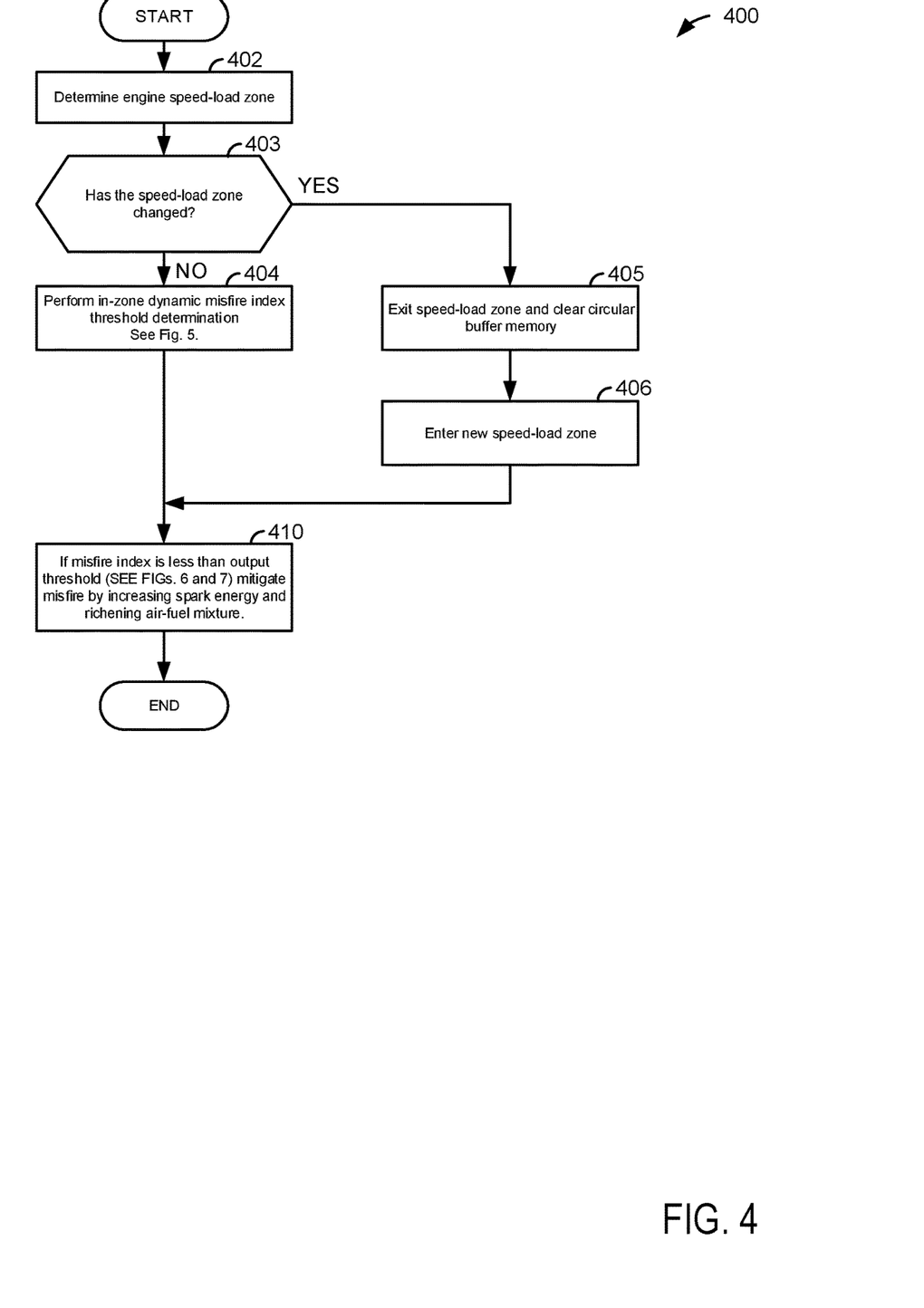
FIGS. 4-7 show a flow chart of an example method for controlling an engine and processing the misfire threshold determination signals.

Referring now to FIG. 4, an example flow chart for a method for operating an engine is shown. The method of FIG. 4 may be incorporated into and may cooperate with the system of FIG. 1. Further, at least portions of the method of FIG. 4 may be incorporated as executable instructions stored in non-transitory memory while other portions of the method may be performed via a controller transforming operating states of devices and actuators in the physical world. The methods of FIGS. 5-7 may be included in the method of FIG. 4 as subroutines and they may execute while a vehicle in which the controller resides is traveling on a road.

At 402, method 400 determines the engine's present engine speed and engine load zone. Engine speed and engine load are input to a function that outputs a zone number for a table that holds engine misfire index thresholds as shown in FIG. 3. In one example, the table outputs a value from 1 to 72 based on the engine's present speed and load. Of course, tables or functions with a different number of zones may also be utilized. Method 400 proceeds to 403.

At 403, method 400 judges if the engine's speed and load zone has changes since the last combustion event. In one example, the engine's present speed and load zone is determined for every engine combustion event (e.g., one time for each cylinder cycle in which spark is supplied to ignite an air-fuel mixture), and the most recent engine speed and load zone is compared to the most recent previous engine speed and load. If the present engine speed and load zone is different from the most recent past engine speed and load zone, the answer is no and method 400 proceeds to 404. Otherwise, the answer is yes and method 400 proceeds to 405. The present engine speed and load zone is then saved to memory as the most recent engine speed and load zone.

Figure 5:
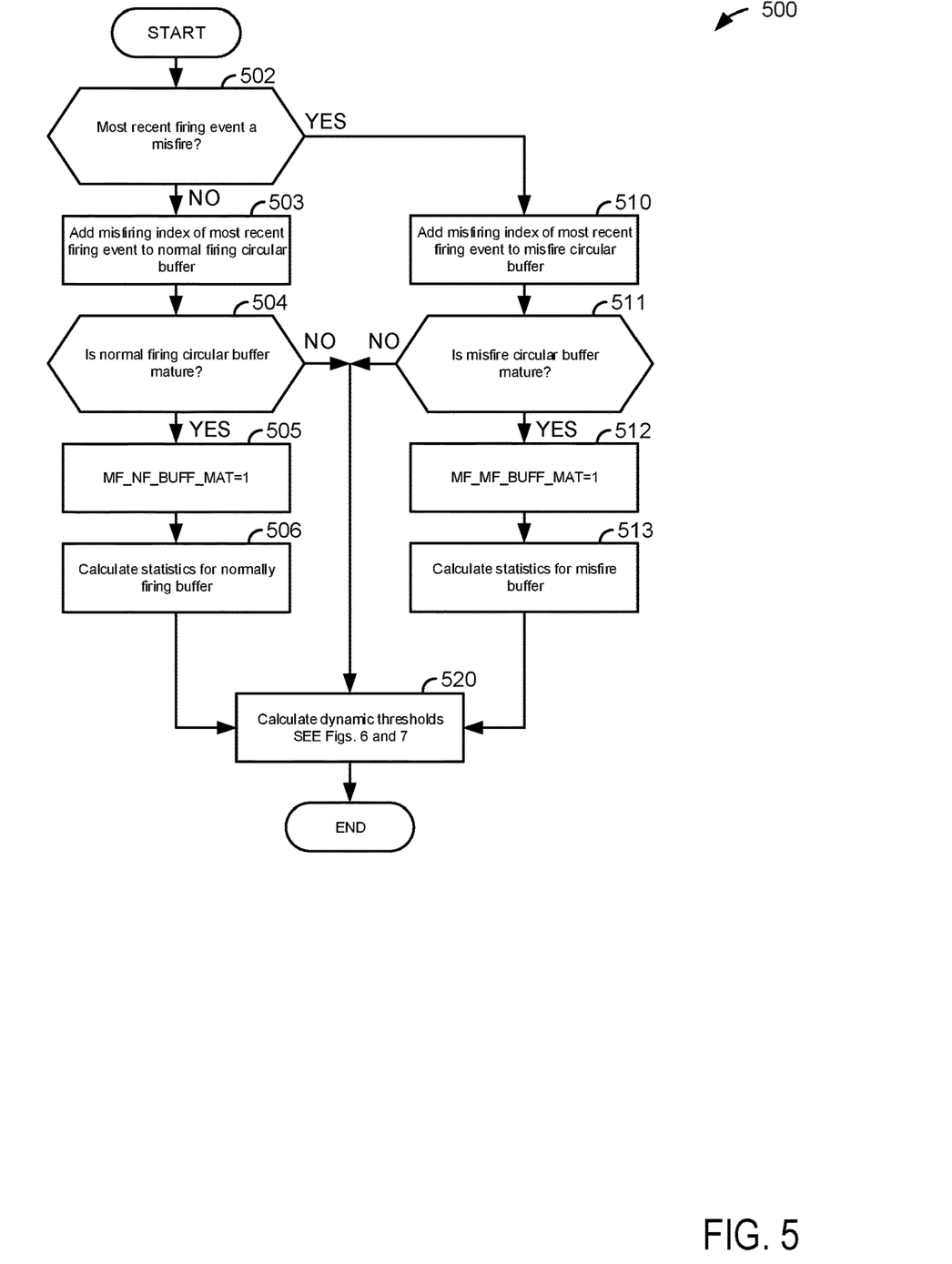

At 404, method 400 performs an in-zone dynamic misfire index threshold determination as is described in FIG. 5. Method 400 proceeds to 410 after performing the in-zone dynamic misfire index threshold determination.

At 405, method 400 exits the engine speed and load zone the engine was operating in to enter a new engine speed and load zone. Method 400 also clears circular buffers in memory for the engine speed and load zone being exited by populating the buffers with zeros. The circular buffers are sections of memory that include predetermined numbers of memory locations for storing predetermined numbers of values. In one example, each circular buffer for the engine speed and load zone includes the predetermined number of locations equal to the total number of engine cylinders or an integer multiple of the same. Data is written into the circular buffers one memory location after another. When a circular buffer is full, the newest value to be stored in the circular buffer replaces the oldest value stored in the circular buffer. The circular buffer may be cleared by writing zeros to all memory locations in the circular buffer. In particular, buffer values in MF_NF_Buf are set to zero and buffer values in MF_MF_Buf are set to zero. Further, all temporary variables for M1-M5 dynamic thresholds are also set to zero. Method 400 proceeds to 406.

At 406, method 400 enters a new engine speed and load zone of the table that holds engine misfire index thresholds as shown in FIG. 3. For each engine speed and load zone, several zone specific statistics are stored in memory. These values are retrieved from memory when the zone is entered. In particular, each engine speed and load zone may include the following parameters which are retrieved from memory (i.e., zone-level parameters):

Zone_Min_NF: minimum value for engine misfire index values for normal firing (e.g., where misfire is not present);

Zone_Max_NF: maximum valve for engine misfire index values for normal firing;

Zone_Mean_NF: mean value of engine misfire index values for normal firing;

Zone_Std_NF: standard deviation of the engine misfire index values for normal firing;

Zone_Min_MF: minimum value for engine misfire index values where misfire is present;

Zone_Max_MF: maximum valve for engine misfire index values where misfire is present;

Zone_Mean_MF: mean value of engine misfire index values where misfire is present; and Zone_Std_MF: standard deviation of the engine misfire index values where misfire is present. Method 400 proceeds to 410 after entering the new engine speed and load zone of the table that holds the engine misfire index thresholds.

Figure 6:
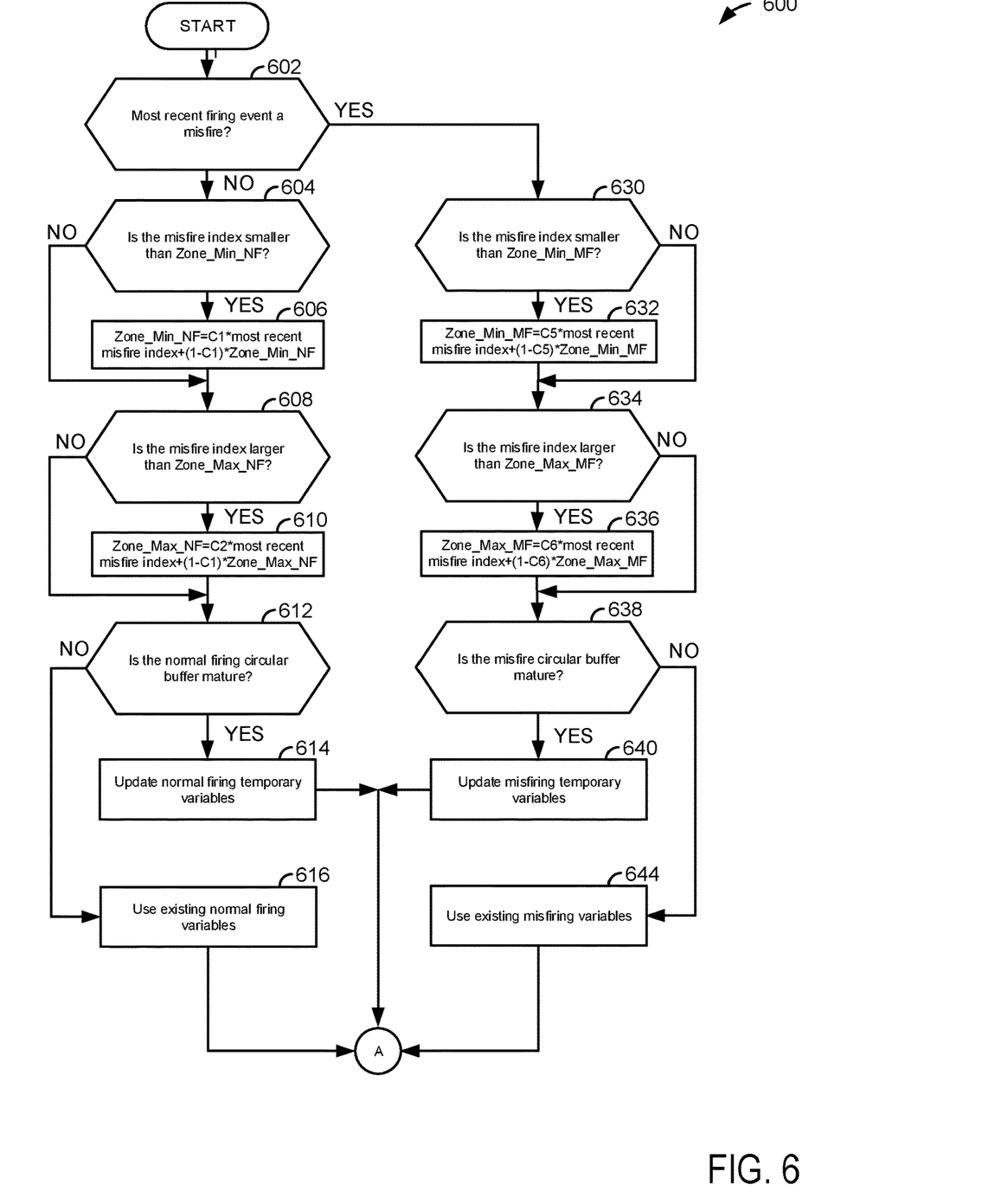
Figure 7:
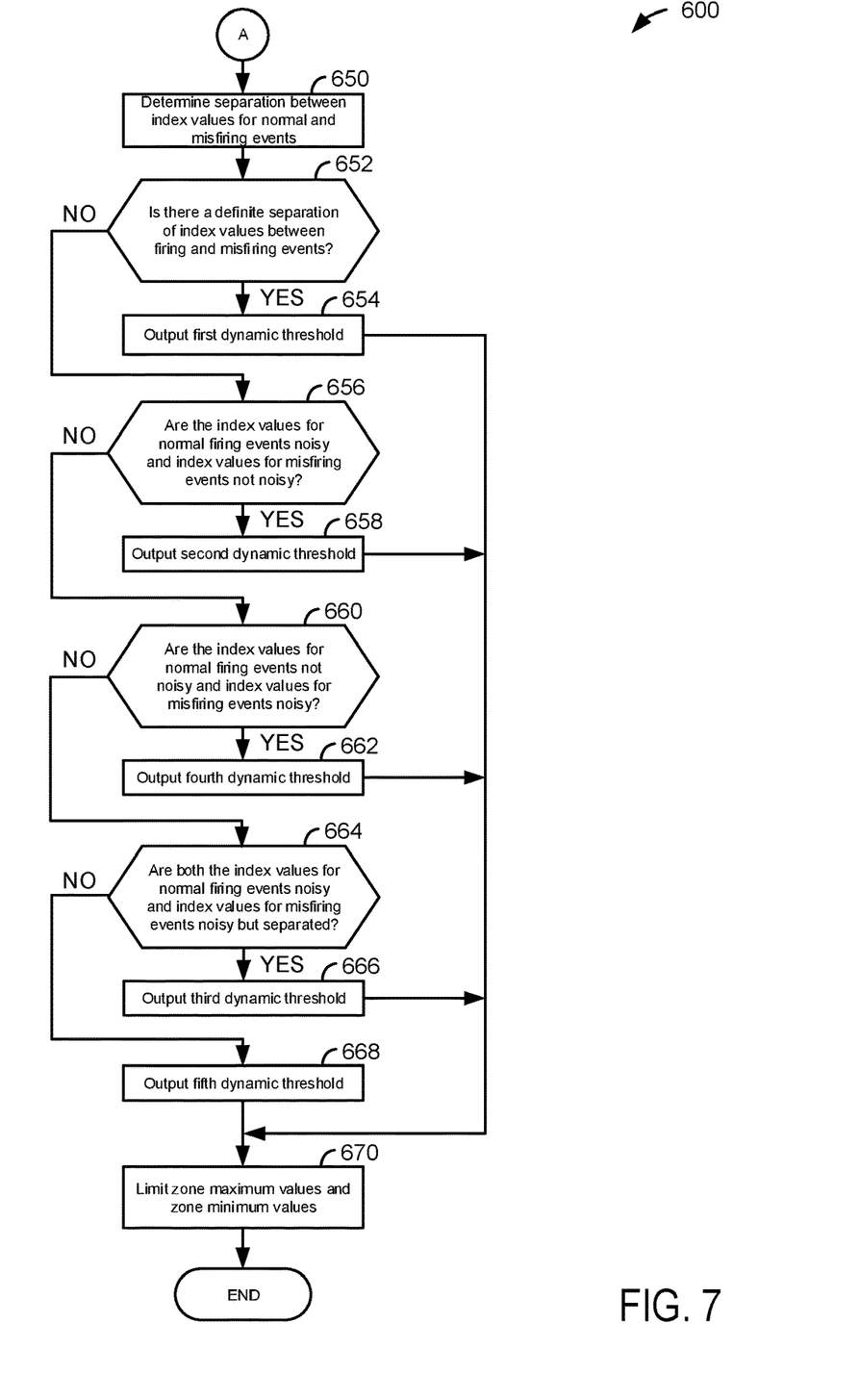

At 410, method 400 attempts to mitigate engine misfire in engine cylinders if misfire is indicated based on the value of the engine misfire index for the most recent combustion event and the output threshold as described in FIGS. 6 and 7. If engine misfire is indicated one or more actuators may be adjusted via the controller to reduce the possibility of subsequent misfires. For example, spark energy may be increased via increasing a dwell time or an amount of time an ignition coil is charged. Alternatively, or in addition, an air-fuel ratio of an engine cylinder may be richened via increasing an amount of fuel supplied to a cylinder that previously misfired. In these ways, the possibility of additional cylinder misfires may be reduced. Method 400 exits.

Referring now to FIG. 5, a method for determining an in-zone dynamic threshold for engine misfire index values is described. The method of FIG. 5 may be part of the method of FIG. 4 and it may be included in the system of FIG. 1. Further, at least portions of the method of FIG. 5 may be incorporated as executable instructions stored in non-transitory memory while other portions of the method may be performed via a controller transforming operating states of devices and actuators in the physical world.

At 502, method 500 judges if a most recent firing event (e.g., spark in a cylinder to produce combustion of air and fuel in the cylinder) resulted in a misfire. In one example, acceleration of the engine during a power stroke of the cylinder having the most recent firing event is compared to a misfire index threshold to determine whether or not the most recent firing event resulted in a misfire. If method 500 judges misfire is present, the answer is yes and method 500 proceeds to 510. Otherwise, the answer is no and method 500 proceeds to 503.

At 503, method 500 enters the most recent firing event's misfire index to the normal firing circular buffer (e.g., MF_NF_Buf). Misfire indexes are entered into the normal firing circular buffer in a one after the other way. When the circular buffer is filled, a new misfire index replaces the oldest misfire index in the circular buffer. Method 500 proceeds to 504.

At 504, method 500 judges if the normal firing buffer is mature. The normal firing buffer may be judged to be mature when the normal firing buffer is completely filled with misfire index values that are based on engine acceleration. If method 500 judges that the normal firing buffer is mature, the answer is yes and method 500 proceeds to 505. Otherwise, the answer is no and method 500 proceeds to 520.

At 505, method 500 sets the variable MF_NF_BUFF_MAT equal to one. The variable MF_NF_BUFF_MAT indicates that the normal firing buffer is mature when it is equal to a value of one. Method 500 proceeds to 506.

At 506, method 500 calculates selected statistical attributes based on engine misfire index values stored in the normal firing buffer MF_NF_Buf. In particular, method 500 calculates the following statistics based on values in the normal firing buffer (i.e., buffer-level parameters for normal firing events):

Min_NF: minimum value for engine misfire index values stored in MF_NF_Buff for normal firing (e.g., where misfire is not present);

Max_NF: maximum valve for engine misfire index values stored in MF_NF_Buff for normal firing;

Mean_NF: mean value of engine misfire index values stored in MF_NF_Buff for normal firing; and Std_NF: standard deviation of the engine misfire index values stored in MF_NF_Buff for normal firing. The standard deviation and mean values are determined as known in the art. Method 500 proceeds to 520.

At 520, method 500 determines dynamic thresholds for the engine misfire index values. The dynamic thresholds are determined as discussed in the description of FIGS. 6 and 7. Method 500 proceeds to exit.

At 510, method 500 enters the most recent firing event's misfire index to the misfire circular buffer (e.g., MF_MF_Buf). Misfire indexes are entered into the misfire circular buffer in a one after the other way. When the circular buffer is filled, a new misfire index replaces the oldest misfire index in the circular buffer. Method 500 proceeds to 511.

At 511, method 500 judges if the misfire buffer is mature. The misfire buffer may be judged to be mature when the misfire buffer is completely filled with misfire index values that are based on engine acceleration. If method 500 judges that the misfire buffer is mature, the answer is yes and method 500 proceeds to 512. Otherwise, the answer is no and method 500 proceeds to 520.

At 512, method 500 sets the variable MF_MF_BUFF_MAT equal to one. The variable MF_MF_BUFF_MAT indicates that the misfire buffer is mature when it is equal to a value of one. Method 500 proceeds to 513. Note: the buffer-level parameters play their role to the output misfire threshold when MF_MF_BUFF_MAT is equal to 1.

At 513, method 500 calculates selected statistical attributes based on engine misfire index values stored in the misfiring buffer MF_MF_Buf. In particular, method 500 determines the following statistics based on values in the misfiring buffer (i.e., buffer-level parameters for misfiring events):

Min_MF: minimum value for engine misfire index values stored in MF_MF_Buff for misfire;

Max_MF: maximum valve for engine misfire index values stored in MF_MF_Buff for misfire; Mean_MF: mean value of engine misfire index values stored in MF_MF_Buff for misfire; and Std_MF: standard deviation of the engine misfire index values stored in MF_MF_Buff for misfire. The standard deviation and mean values are determined as known in the art. Method 500 proceeds to 520.

Referring now to the method of FIGS. 6 and 7, a method for determining dynamic misfire index thresholds is shown. The method of FIGS. 6 and 7 may be included with the methods of FIGS. 4 and 5 in the system of FIG. 1. Further, at least portions of the method of FIGS. 6 and 7 may be incorporated as executable instructions stored in non-transitory memory while other portions of the method may be performed via a controller transforming operating states of devices and actuators in the physical world.

At 602, method 600 judges if a most recent firing event (e.g., spark in a cylinder to produce combustion of air and fuel in the cylinder) resulted in a misfire. In one example, acceleration of the engine during a power stroke of the cylinder having the most recent firing event is compared to a misfire index threshold to determine whether or not the most recent firing event resulted in a misfire. If method 600 judges misfire is present, the answer is yes and method 600 proceeds to 630. Otherwise, the answer is no and method 600 proceeds to 604.

At 604, method 600 judges if the misfire index for the most recent firing event is smaller than the value of variable Zone_Min_NF (e.g., minimum value for engine misfire index values for normal firing or a lower threshold that engine misfire index values are not permitted beneath). If method 600 judges that the most recent firing event is smaller than the value of variable Zone_Min_NF, the answer is yes and method 600 proceeds to 606. Otherwise, the answer is no and method 600 proceeds to 608.

At 606, method 600 adjusts the value of Zone_Min_NF. In particular, the value of variable Zone_Min_NF is adjusted based on the following equation:

$$Zone\_Min\_NF = C1*MisFir\_Idx + (1-C1)*Zone\_Min\_NF$$

where C1 is a predetermined coefficient, MisFir_Idx is the most recent misfire index that is normal firing, and Zone_Min_NF is the minimum value for engine misfire index values for normal firing or a lower threshold that engine misfire index values are not permitted beneath. In this way, Zone_Min_NF is filtered based on the most recent firing index to move with vehicle operating conditions. Method 600 proceeds to 608.

At 608, method 600 judges if the misfire index for the most recent firing event is larger than the value of variable Zone_Max_NF (e.g., maximum value for engine misfire index values for normal firing or an upper or higher threshold that engine misfire index values are not permitted above). If method 600 judges that the most recent firing event is greater than the value of variable Zone_Max_NF, the answer is yes and method 600 proceeds to 610. Otherwise, the answer is no and method 600 proceeds to 612.

At 610, method 600 adjusts the value of Zone_Max_NF. In particular, the value of variable Zone_Max_NF is adjusted based on the following equation:

$$Zone\_Mas\_NF = C2*MisFir\_Idx + (1-C2)*Zone\_Max\_NF$$

where C2 is a predetermined coefficient, Fir_Idx is the most recent misfire index that is normal firing, and Zone_Max_NF is the maximum value for engine misfire index values for normal firing or a upper threshold that engine misfire index values are not permitted above. In this way, Zone_Max_NF is filtered based on the most recent firing index to move with vehicle operating conditions. Method 600 proceeds to 612.

At 612, method 600 judges if the normal firing circular buffer MF_NF_Buf is mature. In particular, if the value of MF_NF_BUFF_MAT=1, then the answer is yes and method 600 proceeds to 614. Otherwise, the answer is no and method 600 proceeds to 616.

At 614, normal firing temporary variables are updated. In particular, method 600 determines the following statistics:

$$Mean\_NF\_temp = D1*Mean\_NF + (1-D1)*Zone\_Mean\_NF$$

$$Zone\_Mean\_NF = C3*Mean\_NF + (1-C3)*Zone\_Mean\_NF$$

$$Std\_NF\_temp = D2*Std\_NF + (1-D2)*Zone\_Std\_NF$$

$$Zone\_Std\_NF = C4*Std\_NF + (1-C4)*Zone\_Std\_NF$$

$$Max\_NF\_temp = D3*Max\_NF + (1-D3)*Zone\_Max\_NF$$

$$Min\_NF\_temp = D4*Min\_NF + (1-D4)*Zone\_Min\_NF$$

where Mean_NF_temp is a temporary value of the mean engine firing index for normal firing, Zone_Mean_NF is the mean engine firing index for normal firing in the present engine operating zone, Std_NF_temp is a temporary value of the standard deviation for engine firing indexes for normal firing, Zone_Std_NF is the standard deviation of the engine firing indexes for normal firing in the present engine operating zone, Max_NF_temp is the temporary maximum or upper threshold for engine firing index, Zone_Max_NF is the maximum or upper threshold for engine firing indexes for normal firing in the present engine operating zone, Min_NF_temp is the temporary minimum or lower threshold for engine firing index, Zone_Min_NF is the minimum or lower threshold for engine firing indexes for normal firing in the present engine operating zone, C3, C4, and D1-D4 are predetermined coefficients. The statistics above are filtered to adapt over time. Method 600 proceeds to 650 of FIG. 7.

At 616, method 600 uses existing zone-level statistics for temporary normal firing variables. In particular:

$$Mean\_NF\_temp = Zone\_Mean\_NF$$

$$Std\_NF\_temp = Zone\_Std\_NF$$

$$Max\_NF\_temp = Zone\_Max\_NF$$

$$Min\_NF\_temp = Zone\_Min\_NF$$

The existing statistics are used to determine the temporary variables because the normal firing buffer in immature. Method 600 proceeds to 650 of FIG. 7.

At 630, method 600 judges if the misfire index for the most recent firing event is smaller than the value of variable Zone_Min_MF (e.g., minimum value for engine misfire index values for misfiring or a lower threshold that engine misfire index values are not permitted beneath). If method 600 judges that the most recent firing event is smaller than the value of variable Zone_Min_MF, the answer is yes and method 600 proceeds to 632. Otherwise, the answer is no and method 600 proceeds to 634.

At 632, method 600 adjusts the value of Zone_Min_MF. In particular, the value of variable Zone_Min_MF is adjusted based on the following equation:

$$Zone\_Min\_MF = C5*MisFir\_Idx + (1-C5)*Zone\_Min\_MF$$

where C5 is a predetermined coefficient, MisFir_Idx is the most recent misfire index that is misfiring, and Zone_Min_MF is the minimum value for engine misfire index values for misfiring or a lower threshold that engine misfire index values are not permitted beneath. In this way, Zone_Min_MF is filtered based on the most recent firing index to move with vehicle operating conditions. Method 600 proceeds to 634.

At 634, method 600 judges if the misfire index for the most recent firing event is larger than the value of variable Zone_Max_MF (e.g., maximum value for engine misfire index values for misfiring or an upper or higher threshold that engine misfire index values are not permitted above). If method 600 judges that the most recent firing event is greater than the value of variable Zone_Max_MF, the answer is yes and method 600 proceeds to 636. Otherwise, the answer is no and method 600 proceeds to 638.

At 636, method 600 adjusts the value of Zone_Max_MF. In particular, the value of variable Zone_Max_NF is adjusted based on the following equation:

$$Zone\_Max\_MF = C6*MisFi\_Idx + (1-C6)*Zone\_Max\_MF$$

where C6 is a predetermined coefficient, MisFir_Idx is the most recent misfire index that is misfiring, and Zone_Max_MF is the maximum value for engine misfire index values for misfiring or a upper threshold that engine misfire index values are not permitted above. In this way, Zone_Max_MF is filtered based on the most recent firing index to move with vehicle operating conditions. Method 600 proceeds to 638.

At 638, method 600 judges if the misfiring circular buffer MF_MF_Buf is mature. In particular, if the value of MF_MF_BUFF_MAT=1, then the answer is yes and method 600 proceeds to 640. Otherwise, the answer is no and method 600 proceeds to 644.

At 640, misfiring temporary variables are updated. In particular, method 600 determines the following statistics:

Mean_MF_temp=$D5$*Mean_MF+(1−$D5$)*Zone_Mean_MF

Zone_Mean_MF=$C7$*Mean_MF+(1−$C7$)*Zone_Mean_MF

Std_MF_temp=$D6$*Std_MF+(1−$D6$)*Zone_Std_MF

Zone_Std_MF=$C8$*Std_MF+(1−$C8$)*Zone_Std_MF

Max_MF_temp=$D7$*Max_MF+(1−$D7$)*Zone_Max_MF

Min_MF_temp=$D8$*Min_MF+(1−$D8$)*Zone_Min_MF where Mean_MF_temp is a temporary value of the mean engine firing index for misfiring, Zone_Mean_MF is the mean engine firing index for misfiring in the present engine operating zone, Std_MF_temp is a temporary value of the standard deviation for engine firing indexes for misfiring, Zone_Std_MF is the standard deviation of the engine firing indexes for misfiring in the present engine operating zone, Max_MF_temp is the temporary maximum or upper threshold for engine firing index, Zone_Max_MF is the maximum or upper threshold for engine firing indexes for misfiring in the present engine operating zone, Min_MF_temp is the temporary minimum or lower threshold for engine firing index, Zone_Min_MF is the minimum or lower threshold for engine firing indexes for misfiring in the present engine operating zone, C7, C8, and D5-D8 are predetermined coefficients. The statistics above are filtered to adapt over time. Method 600 proceeds to 650 of FIG. 7.

At 644, method 600 uses existing statistics for temporary normal firing variables. In particular:

Mean_MF_temp=Zone_Mean_MF

Std_MF_temp=Zone_Std_MF

Max_MF_temp=Zone_Max_MF

Min_MF_temp=Zone_Min_MF

The existing statistics are used to determine the temporary variables because the misfiring buffer in immature. Method 600 proceeds to 650 of FIG. 7.

At 650, method 600 determines variables for assessing separation between misfiring and normal firing events. In particular, method 600 determines the following variables:

DT_$M1$_$Q$=Mean_NF_temp−$S1$*Std_NF_temp−(Mean_MF_temp+$S1$*Std_MF_temp)

DT_$M2$_$Q$=Min_NF_temp−(Mean_MF_temp+$S1$*Std_MF_temp)

DT_$M3$_$Q$=Min_NF_temp−Max_MF_temp

DT_$M4$_$Q$=Mean_NF_temp−$S1$*Std_NF_temp−Max_MF_temp

DT_$M5$_$Q$=Mean_NF_temp−$S2$+Std_NF_temp−(Mean_MF_temp+$S2$*Std_MF_temp)

where S1 and S2 are predetermined coefficients, DT_M1_Q is the temporary parameter to indicate the gap between normal firing index distribution (represented by Mean_NF_temp, Std_NF_temp, and S1) and misfiring index distribution (Mean_MF_temp, Std_MF_temp, and S1), DT_M2_Q is the temporary parameter to indicate the gap between the minimum value of normal firing index and the misfiring index distribution, DT_M3_Q is the temporary parameter to indicate the gap between the minimum value of normal firing index and the maximum value of misfiring index, DT_M4_Q is the temporary parameter to indicate the gap between the distribution of normal firing index and the maximum value of misfiring index, and DT_M5_Q is the temporary parameter to indicate the gap between the modified distribution of normal firing index (Mean_NF_temp, Std_NF_temp, and S1) and the modified distribution of misfiring index (Mean_MF_temp, Std_MF_temp, and S2). Method 600 proceeds to 652.

At 652, method 600 judges if there is a definite separation of misfiring index values between normal firing events and misfiring events. In other words, method 600 judges if misfire index values for normal firing events are greater than or less than misfire index values for misfiring events and that misfire index values for normal firing events do not equal misfire index values for misfiring events. Specifically, method 600 judges if DT_M1_Q>=0. If so, the answer is yes and method 600 proceeds to 654. Otherwise, the answer is no and method 600 proceeds to 656.

At 654, method 600 outputs a dynamic threshold M1. The threshold is determined via the following equation:

Output_Threshold=Mean_NF_temp−$S1$*Std_NF_temp−DT_$M1$_$Q$/2 where Output_Threshold is the output misfire threshold value for judging the presence or absence of misfire. If a subsequent misfire index value is greater than Output_threshold, the subsequent cylinder combustion event is a normal firing (not a misfire). If the misfire index value is less than Output_threshold, the subsequent cylinder combustion event is a misfire. The output threshold in stored in a cell of a table or function for the present engine operating zone (e.g., in cell 45 of the table shown in FIG. 3). Method 600 proceeds to 670.

At 656, method 600 judges if the misfire index values for normal firing events are noisy and if the index values for misfiring events are not noisy. Misfire index values for normal firing events may be characterized as noisy if values of the misfire indexes have a distribution wider than a threshold distribution (e.g., six standard deviations). Misfire index values for misfiring events may be characterized as not noisy if values of the misfire indexes have a distribution less than a threshold distribution (e.g., six standard deviations). Specifically, method 600 judges if DT_M2_Q>=0 and if DT_M4_Q<=0. If so, the answer is yes and method 600 proceeds to 658. Otherwise, the answer is no and method 600 proceeds to 660.

At 658, method 600 outputs a dynamic threshold M1. The threshold is determined via the following equation:

Output_Threshold=Mean_temp−$S1$*Std_MF_temp−DT_$M2$_$Q$/2 where Output_Threshold is the output misfire threshold value for judging the presence or absence of misfire. If a subsequent misfire index value is greater than Output_threshold, the subsequent cylinder combustion event is a normal firing (not a misfire). If the misfire index value is less than Output_threshold, the subsequent cylinder combustion event is a misfire. The output threshold in stored in a cell of a table or function for the present engine operating zone (e.g., in cell 45 of the table shown in FIG. 3). Method 600 proceeds to 670.

At 660, method 600 judges if the misfire index values for normal firing events are not noisy and if the index values for misfiring events are noisy. Misfire index values for normal firing events may be characterized as not noisy if values of the misfire indexes have a distribution narrower or less than a threshold distribution (e.g., six standard deviations). Misfire index values for misfiring events may be characterized as noisy if values of the misfire indexes have a distribution wider than or greater than a threshold distribution (e.g., six standard deviations). Specifically, method 600 judges if $DT\_M2\_Q <= 0$ and if $DT\_M4\_Q >= 0$. If so, the answer is yes and method 600 proceeds to 662. Otherwise, the answer is no and method 600 proceeds to 664.

At 662, method 600 outputs a dynamic threshold M4. The threshold is determined via the following equation:

$$Output\_Threshold = Mean\_NF\_temp - S1*Std\_NF\_temp - DT\_M4\_Q/2$$

where Output_Threshold is the output misfire threshold value for judging the presence or absence of misfire. If a subsequent misfire index value is greater than Output_threshold, the subsequent cylinder combustion event is a normal firing (not a misfire). If the misfire index value is less than Output_threshold, the subsequent cylinder combustion event is a misfire. The output threshold in stored in a cell of a table or function for the present engine operating zone (e.g., in cell 45 of the table shown in FIG. 3). Method 600 proceeds to 670.

At 664, method 600 judges if the misfire index values for normal firing events are noisy and if the index values for misfiring events are noisy, but there is separation between normal firing event misfire index values and misfiring event misfire index values. Misfire index values for normal firing events may be characterized as noisy if values of the misfire indexes have a distribution narrower or greater than a threshold distribution (e.g., six standard deviations) and there may be separation between normal firing event misfire index values and misfiring event misfire index value if normal firing event misfire index values are greater or less than and not equal to misfiring event misfire index values. Specifically, method 600 judges if $DT\_M3\_Q >= 0$. If so, the answer is yes and method 600 proceeds to 666. Otherwise, the answer is no and method 600 proceeds to 668.

At 666, method 600 outputs a dynamic threshold M3. The threshold is determined via the following equation:

$$Output\_Threshold = Min\_NF\_temp - DT\_M3\_Q/2$$

where Output_Threshold is the output misfire threshold value for judging the presence or absence of misfire. If a subsequent misfire index value is greater than Output_threshold, the subsequent cylinder combustion event is a normal firing (not a misfire). If the misfire index value is less than Output_threshold, the subsequent cylinder combustion event is a misfire. The output threshold in stored in a cell of a table or function for the present engine operating zone (e.g., in cell 45 of the table shown in FIG. 3). Method 600 proceeds to 670.

At 668, method 600 outputs a dynamic threshold M5. The threshold is determined via the following equation:

$$Output\_Threshold = Mean\_NF\_temp - S2*Std\_NF\_temp - DT\_M5\_Q/2$$

where Output_Threshold is the output misfire threshold value for judging the presence or absence of misfire. If a subsequent misfire index value is greater than Output_threshold, the subsequent cylinder combustion event is a normal firing (not a misfire). If the misfire index value is less than Output_threshold, the subsequent cylinder combustion event is a misfire. The output threshold in stored in a cell of a table or function for the present engine operating zone (e.g., in cell 45 of the table shown in FIG. 3). Method 600 proceeds to 670.

At 670 the output threshold is restricted to a value between Zone_min and Zone max. The value of the output threshold is limited to prevent the output threshold from taking on extreme values. Method 600 proceeds to exit.

It should be noted that misfire index values may be normalized to zero or other values. As such, the methods described herein are not limited to where misfire is indicated by misfire index values less than a threshold value.

Thus, the method of FIGS. 4-7 provides for an engine control method, comprising: dividing an engine operating region into a plurality of zones, each zone within the plurality of zones defined by an engine speed range and an engine load or engine torque range; storing misfire threshold values in memory representing each of the plurality of zones; and adjusting an actuator via a controller responsive to an indication of misfire based on the misfire threshold level. The method includes where the misfire threshold values are dynamically determined based on misfire index values that are calculated from crankshaft speed or acceleration, and further comprising determining a real-time misfire threshold for each of the plurality of zones by calculating two sets of statistical parameters: zone-level statistical parameters that are updated for each engine firing event, and buffer-level statistical parameters that are real-time calculated from a circular buffer of immediate past misfire index values to quickly adapt to engine operation conditions based on real-time misfire index values, and dynamically outputting the misfire threshold to the memory by combining zone-level and buffer-level statistical parameters and mixing the two sets of statistical parameters.

In some examples, the method includes where the zone-level statistical parameters include but are not limited to mean value, standard deviation, maximum value, and minimum value, an initial value of zone-level parameters based on averaging statistical characteristics of the misfire index values for a same zone from development vehicles, and the zone-level parameters being updated for each firing event of an engine, and where the zone-level parameters are stored in non-volatile memory of a controller such that the zone-level parameters track the misfire index values of an associated zone included in the plurality of zones regardless of vehicle driving cycles. The method includes where the buffer-level statistical parameters include but are not limited to mean value, standard deviation, maximum value, and minimum value, the buffer-level statistical parameters sourced from the circular buffer that stores recent misfire index values, where the circular buffer is cleared when an engine enters a new zone within the plurality of zones, where the buffer-level parameters are not calculated until the circular buffer is mature and only zone-level parameters are a basis for misfire threshold determination before the buffer-level parameters are determined. The method includes where the actuator is a fuel injector or an ignition system, and further comprising adjusting the stored misfire threshold values while a vehicle is traveling down a road. The method includes where the misfire threshold value is dynamically selected from five threshold values.

In other examples, the method includes where the five thresholds include a threshold for a misfire index value that is dynamically determined by a combination of a n-sigma distribution zone of normal firing/misfiring events, where the n-sigma distribution zone is a zone of mean value plus or minus n times the associated standard deviation, and a threshold number of normal firing/misfiring events, and where: for a first condition, the threshold lies between the n-sigma distribution normal firing misfiring events and the n-sigma distribution of misfiring events; for a second condition, the threshold lies between a threshold number of normal firing misfiring events and the n-sigma distribution of misfiring events; for a third condition, the threshold lies between the n-sigma distribution of normal firing misfiring events and the threshold number of events; for a fourth condition, the threshold lies between a first threshold number of normal firing misfiring events and a second threshold of misfiring events; and for a fifth condition, the threshold lies between a m-sigma distribution of normal firing misfiring events and a m-sigma distribution of misfiring events, where m and n are integer numbers and where m is smaller than n.

The method of FIGS. 4-7 also provides for an engine control method, comprising: dividing an engine operating region into a plurality of zones, each zone within the plurality of zones defined by an engine speed range and an engine torque range; adapting a misfire threshold value via a controller based on a most recent misfire index value; storing statistical parameters that are a basis for determining the misfire threshold value in memory representing one of the plurality of zones; and dynamically selecting the misfire threshold by combining zone-level and buffer-level parameters and mixing the associated statistical parameters; and adjusting an actuator via the controller responsive to an indication of misfire based on the misfire threshold. The method includes where adapting the misfire threshold includes adjusting one or more parameters based on the most recent misfire index value and adjusting the misfire threshold based on the one or more parameters. The method includes where the one or more parameters includes a standard deviation of a plurality of misfire index values stored in memory.

In some examples, the method includes where the one or more parameters includes a mean of a plurality of misfire index values stored in memory. The method includes where the one or more parameters includes a mean of a lower threshold for misfire index values stored in memory. The method includes where the one or more parameters includes a mean of an upper threshold for misfire index values stored in memory. The method includes where the misfire threshold value is selected from five threshold values.

The method of FIGS. 4-7 also provides for an engine control method, comprising: dividing an engine operating region into a plurality of zones, each zone within the plurality of zones defined by an engine speed range and an engine torque range; storing misfire threshold values in each of the plurality of zones, the misfire threshold values determined from statistical attributes of a plurality of misfire index values stored in memory of a controller; dynamically adjusting the misfire threshold to adapt impacts of vehicle life-cycle changes and control strategy/hardware impacts on misfire index values, and adjusting an actuator via the controller responsive to an indication of misfire based on the misfire threshold level. The method includes where the statistical attributes include a mean of the plurality of misfire index values. The method includes where the statistical attributes include a mean value, standard deviation, maximum, and minimum of the plurality of misfire index values.

In some examples, the method further comprises dynamically selecting the misfire values from five threshold levels based on the statistical attributes. The method includes the selection of misfire thresholds depending on the signal qualify (i.e. statistical characteristics) of normal firing and misfiring events. The method includes where the five thresholds include a threshold for misfire index values that is dynamically determined by the combination of the distribution of normal firing/misfiring events, and the maximum/minimum of normal firing/misfiring events.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
    dividing an engine operating region into a plurality of zones, each zone within the plurality of zones defined by an engine speed range and an engine load or engine torque range;
    storing a plurality of misfire threshold values in memory associated with the plurality of zones, where the plurality of stored misfire threshold values are each dynamically selected from a group of five dynamic threshold values, and where the group of five dynamic threshold values includes a dynamic threshold value for a misfire index value that is dynamically determined by a combination of a n-sigma distribution zone of normal firing/misfiring events or a n-sigma distribution zone of misfiring events, where the n-sigma distribution zone is a zone of mean value plus or minus n times an associated standard deviation, and a threshold number of normal firing/misfiring events, and where:

for a first condition, the dynamic threshold value lies between the n-sigma distribution zone of normal firing/misfiring events and the n-sigma distribution zone of misfiring events;

for a second condition, the dynamic threshold value lies between the threshold number of normal firing/misfiring events and the n-sigma distribution zone of misfiring events;

for a third condition, the dynamic threshold value lies between the n-sigma distribution of normal firing/misfiring events and the threshold number of normal firing/misfiring events;

for a fourth condition, the dynamic threshold value lies between the threshold number of normal firing/misfiring events and the threshold number of misfiring events; and for a fifth condition, the dynamic threshold value lies between a m-sigma distribution of normal firing/misfiring events and a m-sigma distribution of misfiring events, where m and n are integer numbers and where m is smaller than n; and adjusting an actuator via a controller responsive to an indication of misfire based on the dynamic threshold value.

2. The method of claim 1, where the plurality of misfire threshold values is dynamically determined based on misfire index values that are calculated from crankshaft speed or acceleration, and further comprising determining a misfire threshold value included in the plurality of misfire threshold values for one of the plurality of zones by calculating zone-level statistical parameters that are updated for each engine firing event, and buffer-level statistical parameters that are calculated from a circular buffer of immediate past misfire index values to quickly adapt to engine operation conditions based on misfire index values, and dynamically outputting the misfire threshold value to the memory by combining the zone-level and the buffer-level statistical parameters.

3. The method of claim 2, where the zone-level statistical parameters include but are not limited to mean value, standard deviation, maximum value, and minimum value, an initial value based on averaging statistical characteristics of the misfire index values for a same zone from development vehicles, and where the zone-level statistical parameters are updated for each engine firing event, and where the zone-level statistical parameters are stored in non-volatile memory of the controller such that the zone-level statistical parameters track the misfire index values of an associated zone included in the plurality of zones regardless of vehicle driving cycles.

4. The method of claim 2, where the buffer-level statistical parameters include but are not limited to mean value, standard deviation, maximum value, and minimum value, where the buffer-level statistical parameters are sourced from the circular buffer that stores recent misfire index values, where the circular buffer is cleared when an engine enters a new zone within the plurality of zones, where the buffer-level statistical parameters are not calculated until the circular buffer is mature and only zone-level statistical parameters are a basis for determining the misfire threshold value before the buffer-level statistical parameters are determined.

5. The method of claim 1, where the actuator is a fuel injector or an ignition system, further comprising adjusting the plurality of stored misfire threshold values while a vehicle is traveling down a road, and further comprising adjusting one of the plurality of stored misfire threshold values based on a most recent misfire index value.

6. An engine control method, comprising:
dividing an engine operating region into a plurality of zones, each zone within the plurality of zones defined by an engine speed range and an engine load or engine torque range;

adjusting a misfire threshold value via a controller based on a most recent misfire index value, where the misfire threshold value is selected from five dynamic threshold values, where the five dynamic threshold values include a dynamic threshold value for a misfire index value that is dynamically determined by a combination of a n-sigma distribution zone of normal firing/misfiring events or a n-sigma distribution zone of misfiring events, where the n-sigma distribution zone is a zone of mean value plus or minus n times an associated standard deviation, and a threshold number of normal firing/misfiring events, and where:

for a first condition, the dynamic threshold value lies between the n-sigma distribution zone of normal firing/misfiring events and the n-sigma distribution zone of misfiring events;

for a second condition, the dynamic threshold value lies between the threshold number of normal firing/misfiring events and the n-sigma distribution zone of misfiring events;

for a third condition, the dynamic threshold value lies between the n-sigma distribution zone of normal firing/misfiring events and the threshold number of normal firing/misfiring events;

for a fourth condition, the dynamic threshold value lies between a threshold number of normal firing/misfiring events and the threshold number of misfiring events; and for a fifth condition, the dynamic threshold value lies between a m-sigma distribution of normal firing/misfiring events and a m-sigma distribution of misfiring events, where m and n are integer numbers and where m is smaller than n;

storing statistical parameters that are a basis for determining the misfire threshold value in memory, the memory representing one of the plurality of zones;

dynamically selecting the misfire threshold value from a plurality of values by combining zone-level and buffer-level statistical parameters; and adjusting an actuator via the controller responsive to an indication of misfire based on the misfire threshold value.

7. The method of claim 6, where adjusting the misfire threshold value includes adjusting one or more parameters based on the most recent misfire index value and adjusting the misfire threshold value based on the buffer-level statistical parameters.

8. The method of claim 7, where the buffer-level statistical parameters include a standard deviation of a plurality of misfire index values stored in memory, and/or a mean of the plurality of misfire index values stored in memory.

9. The method of claim 7, where the buffer-level statistical parameters include a minimum value of a plurality of misfire index values stored in memory.

10. The method of claim 6, wherein the zone-level statistical parameters include but are not limited to mean value, standard deviation, maximum value, and minimum value, an initial value based on averaging statistical characteristics of the misfire index values for a same zone from development vehicles, and where the zone-level statistical parameters are updated for each firing event of an engine, and where the zone-level statistical parameters are stored in non-volatile memory of the controller such that the zone-level statistical parameters track the misfire index values of an associated zone included in the plurality of zones regardless of vehicle driving cycles.

11. The method of claim 6, wherein the buffer-level statistical parameters include but are not limited to mean value, standard deviation, maximum value, and minimum value, the buffer-level statistical parameters sourced from the circular buffer that stores recent misfire index values, where a circular buffer is cleared when an engine enters a new zone within the plurality of zones, where the buffer-level statistical parameters are not calculated until the circular buffer is mature and only zone-level statistical parameters are a basis for a misfire threshold determination before the buffer-level statistical parameters are determined.

* * * * *